Patented Jan. 9, 1923.

1,441,570

UNITED STATES PATENT OFFICE.

FREDERIC WILLIAM VESEY FITZGERALD, OF CAVERSHAM, ENGLAND.

PROCESS FOR THE PREPARATION OF COMMERCIAL PRODUCTS FROM BLOOD.

No Drawing.  Application filed August 12, 1920.  Serial No. 403,113.

*To all whom it may concern:*

Be it known that I, FREDERIC WILLIAM VESEY FITZGERALD, a subject of the King of Great Britain, residing at "Quedgeley," Derby Road, Caversham, in the county of Oxford, England, have invented certain new and useful Improvements in Processes for the Preparation of Commercial Products from Blood, of which the following is a specification.

This invention relates to a process for the production from blood of plastic solid or moldable substances available for a number of useful purposes, and suitable as substitutes for vulcanite, horn, and like materials.

In this process the blood is subjected to thorough oxidation, and is also partially dehydrated at a temperature not substantially exceeding 49° C. and the partially dehydrated blood is then treated with a coagulating agent which produces solidification. It is important that the coagulation be carried out in a particular manner and certain precautions taken, as will be set forth; otherwise the product is liable to become deformed through shrinkage or is liable to crumbling. Heat and pressure may be used to facilitate or accelerate this solidification.

The blood should either be defibrinated before treatment, or its fluidity must be otherwise preserved as by adding a citrate. Preservatives may also be added.

The oxidation, which has as one effect the elimination or diminution of the carbonic acid present, must be thorough, and I have found the best method of producing it is by stirring the blood with a mechanical stirrer for from 17 to 20 hours at a temperature of 46° to 49° C. but my invention is not confined to this method. The temperature should not be allowed to rise above 49° C. or undue thickening would result, while at a lower temperature longer treatment would be necessary.

In carrying out the invention in accordance with the above described method, the dehydration should be carried to such a point that coagulation to a stiff jelly can be effected in from half an hour to two or three hours by the addition of about 2 to 4 per cent of 40 per cent formaldehyde, but care should be taken that the process is stopped at a point where the blood is still sufficiently fluid to be poured from one vessel to another.

As coagulating reagents I employ any of the reagents which coagulate albumen, as formalin, formaldehyde, metallic salts, chromates, strong acids and alkali, etc., but the two that I have found most useful are formalin and caustic soda. Of these two the latter is much the most active and seems to some extent to distort or destroy the structure of the corpuscles, so that a smaller quantity should be employed than in the case of formalin. I have however found that caustic soda possesses the advantage that the dehydration need not be carried so far.

In the preparation of solid substances I add to the blood whose fluidity has been preserved by adding a citrate or similar substance, after oxidation and partial dehydration from 2% to 4% of 40% formalin or formaldehyde or 0.2 to 1% of caustic soda and stir carefully.

The mixture is then poured into a mould where it gradually coagulates to a hard substance. This coagulation may be hastened by keeping the mould at a temperature of about 68° to 71° C.

A second method of solidification that may be used is that of injecting blood, to which a preservative has been preferably added and which may have been subjected to oxidation and partial dehydration as described, in a thin stream into water at a temperature of about 212° F. containing about 1% of 40% formaldehyde or ½% of caustic soda. This immediately effects partial separation of the blood solids from the liquid portion of the blood. Where caustic soda has been added I have found that the separation is facilitated by subsequently neutralizing the alkali. The water is then separated by a centrifugal drier, or by filtration and pressure, or by other suitable means. When blood is treated in accordance with this method of procedure, aeration takes place to some extent in all stages of the treatment, and is completed by the exposure of the molded product to the air.

Where a solid substance is to be produced, it is of importance that as little air as possible should be held mechanically in the blood, as air bubbles form points of weakness. For this reason it is preferable that a process should be employed in which splashing is reduced to a minimum. The air bubbles may, however, be eliminated or reduced by filtration as through a fine wire mesh or by placing the thickened blood in a chamber from which the air can be exhausted, thus causing the entrained air to rise to the surface and escape. But this vacuum process must be used with care, as if it is carried too far it is found that the blood becomes liable to putrefy, probably because some of the oxygen in the blood substances has been withdrawn. For example, I have found that where the blood was exposed to a vacuum of 50% for 1¾ hours putrefaction subsequently occurred.

In another modification of the process, calcium hydrate is added before or during the oxidizing process, which seems to combine with the carbonic acid present and improves the toughness of the products. Oxidizing salts may also be added to the mixture at this stage.

Care must also be taken if insoluble substances, such as calcium hydrate, are used, to prevent their deposition in the blood, as this also is apt to produce points of weakness. Careful stirring, or enclosing the substances in a permeable container, are means for preventing this.

I may also use a third process for forming liquid products which may be subsequently used in the formation of solid products as hereinafter described. For this purpose I stop the dehydration at an earlier period than if a solid product is desired and add smaller quantities of coagulating materials, i. e., from ¾ to 1% of formalin, or .07% or less of caustic soda. In a fourth modification of the process I also form solid plastic substances by forming a solid substance according to the first process; the desiccation is continued until the product is dry, after which it is reduced into a finely divided form as by powdering. A solid product may also be obtained by mixing this dried and powdered product with a liquid substance prepared as described in the third process, so that a stiff mass is produced which may be subsequently dried. Cracks or similar defects may be remedied by subsequent exposure to heat and (or) pressure.

Although in general I prefer to use the blood as a whole, i. e., both the serum and the corpuscles, yet in certain cases where a light coloured product is desired, the corpuscles may be separated by standing or other means, and the serum alone used. In such case I prefer to add a small portion of fibrin, say about one half of that originally contained in the blood, to the mixture. The fibrin is dissolved in a suitable solvent such as potassium nitrate.

The times of treatment and the proportion of the substances to be added necessarily vary with the class of product to be produced, and further vary with the condition of the blood, the temperature, etc., so that experience is necessary to obtain the best results in all cases but they are substantially the times and proportions which have been indicated above.

I will now describe certain of the commercial applications of the present invention.

Vulcanite and ebonite substitute.

Various proportions of the liquid and solid products to which absorbent or filling substances may be added are thoroughly mixed to a stiff mass, and then coagulated and dried with or without subsequent exposure to heat and pressure, or one of these products alone may be used, further coagulant being added if necessary. Any cracks or similar defects may be remedied by such subsequent exposure to heat and pressure. If more than 2% of 40% formaldehyde has been used for the preparation of the liquid product, care must be taken not to add so much as to render the product thick so quickly that it cannot be poured into the mold.

Or the partially dehydrated blood may be thickened by the addition of formaldehyde or other coagulating agent as before described and the mass run into moulds or sheets or any other desired shape or form, the product gradually solidifying to a tough mass by exposure to the air.

Horn and ivory substitute.

The serum is separated from the blood, either by running off the upper serum layer from blood after standing, or by other known means. I prefer to add and mix a proportion of fibrin to and with such separated serum. This mixture of serum, or serum and fibrin, is then treated so as to obtain liquid and solid products in the manner previously described for treating the blood.

The solid product may be subjected to heat and pressure without previous admixture with a proportion of the liquid product to produce similar masses if desired.

What I claim and desire to secure by Letters Patent of the United States is:—

1. A process for obtaining plastic, solid or mouldable substances from blood according to which the blood to be treated is, after its fluidity has been preserved and prior to coagulation, partially dehydrated at a regulated temperature not substantially exceeding 49° C. and thoroughly exposed to air and the partially dehydrated blood is then coagulated to a solid, substantially as described.

2. A process for obtaining plastic, solid or mouldable substances from blood according to which the blood to be treated is, after its fluidity has been preserved and prior to coagulation, partially dehydrated at a regulated temperature not substantially exceeding 49° C. and thoroughly exposed to air and subsequently coagulated to a solid by means of heat, substantially as described.

3. A process in accordance with claim 1 in which the dehydration and exposure to air is effected by stirring the blood in an open vessel at a temperature of 46°–49° C.

4. A process for obtaining plastic, solid or mouldable substances from blood which consists in injecting the blood to be treated in a thin stream into hot liquid and then separating the solid residue, substantially as described.

5. A process for obtaining plastic, solid or mouldable substances from blood which consists in injecting the blood to be treated in a thin stream into hot liquid containing a coagulating re-agent, substantially as described.

6. The addition of calcium hydrate to blood under treatment in accordance with the process claimed in claim 1 substantially as and for the purpose described.

7. The addition of calcium hydrate to blood under treatment in accordance with the process claimed in claim 2 substantially as and for the purpose described.

8. A process for the preparation of plastic, solid or mouldable substances from blood, which consists in treating the blood in two separate portions, each of which is subjected to oxidation and to partial dehydration and is treated with coagulating substances, one portion being so treated until it solidifies whereupon the said solid portion is reduced to a finely divided state and is mixed with the still liquid portion, the whole then solidifying, substantially as described.

In testimony whereof I affix my signature.

FREDERIC WILLIAM VESEY FITZGERALD.